(12) United States Patent
Hoareau et al.

(10) Patent No.: US 10,677,569 B2
(45) Date of Patent: Jun. 9, 2020

(54) VEHICLE DISABLEMENT AND RETRIEVAL

(71) Applicant: International Business Machines Corporation, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, Bethany, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 995 days.

(21) Appl. No.: 15/145,029

(22) Filed: May 3, 2016

(65) Prior Publication Data
US 2017/0321996 A1    Nov. 9, 2017

(51) Int. Cl.
F41H 13/00 (2006.01)
F41B 11/80 (2013.01)
G01S 17/08 (2006.01)
F41H 11/02 (2006.01)

(52) U.S. Cl.
CPC .............. F41H 13/00 (2013.01); F41B 11/80 (2013.01); G01S 17/08 (2013.01); *F41H 11/02* (2013.01)

(58) Field of Classification Search
CPC ........... F41H 11/02; F41H 13/00; F41B 11/80
USPC ......................................................... 124/56
See application file for complete search history.

(56) References Cited

U.S. PATENT DOCUMENTS

| 4,196,668 A * | 4/1980 | Morlock | F41H 9/00 |
| | | | 102/401 |
| 5,415,151 A * | 5/1995 | Fusi | F42B 12/72 |
| | | | 124/1 |
| 7,506,841 B2 * | 3/2009 | Duden | B64G 1/002 |
| | | | 244/171.7 |
| 8,869,782 B2 * | 10/2014 | Blackman | B63C 9/22 |
| | | | 124/56 |
| 8,991,793 B1 | 3/2015 | Bernhardt | |
| 9,056,661 B2 * | 6/2015 | Macri | B63C 9/22 |
| 9,085,362 B1 | 7/2015 | Kilian et al. | |

(Continued)

FOREIGN PATENT DOCUMENTS

| WO | 2006071213 A1 | 7/2006 |
| WO | 2009095654 A1 | 8/2009 |

OTHER PUBLICATIONS

Arcturus UAV "Jump 20" retrieved from https://arcturus-uav.com/product/jump-20; downloaded Feb. 8, 2016; 3 pgs.

(Continued)

*Primary Examiner* — Stephen Johnson
*Assistant Examiner* — Benjamin S Gomberg
(74) *Attorney, Agent, or Firm* — Cantor Colburn LLP; James Nock

(57) ABSTRACT

An aspect includes an agent carrier and an agent disposed in an inner cavity of the agent carrier. The agent includes an expandable foaming material and electromechanical signal blocking particles embedded in the expandable foaming material. An aspect further includes a sensor and agent release mechanism configured to release the agent from the agent carrier based at least in part on a determination, via the sensor, that the agent carrier is within a predetermined distance via the sensor from a vehicle.

7 Claims, 7 Drawing Sheets

(56) References Cited

U.S. PATENT DOCUMENTS

| | | | | |
|---|---|---|---|---|
| 9,140,526 | B1* | 9/2015 | Calvert | F41B 9/0025 |
| 9,175,934 | B1* | 11/2015 | Kilian | F41H 13/00 |
| 9,236,660 | B2* | 1/2016 | Nyght | H01Q 17/00 |
| 2015/0121081 | A1 | 4/2015 | Dayka | |
| 2015/0316345 | A1* | 11/2015 | Brahler, II | F41B 11/72 |
| | | | | 124/73 |
| 2016/0376029 | A1* | 12/2016 | Sekiya | F41H 11/02 |
| | | | | 244/110 F |
| 2017/0356726 | A1* | 12/2017 | Theiss | F41H 13/0006 |

OTHER PUBLICATIONS

Basulto, Dominic "Forget the doubters, commercial drones are here to stay", The Washington Post; retrieved from: http://www.washingtonpost.com/blogs/innovations/wp/2013/12/03/forget-the-doubters-commercial-drones-are-here-to-stay/; Dec. 3, 2013; 3 pgs.

BBC News Europe "How do you catch a drone?" retrieved from: http://www.bbc.com/news/world-europe-31639374; dated Feb. 26, 2015; 5 pgs.

Berlinger, Joshua et al. "2 airliners fly within 100 feet of drone above New York", retrieved from: https://www.cnn.com/2015/08/01/us/drone-airliner-jfk/; Aug. 3, 2015; 3 pgs.

Brehmer, Elwood "Unmanned aerial vehicle industry taking off in Alaska", Alaska Journal of Commerce; Nov. 20, 2013; retrieved: http://www.alaskajournal.com/Alaska-Journal-of-Commerce/November-Issue-4-2013/Unmanned-aerial-vehicle-industry-taking-off-in-Alaska/ ; 4 pgs.

Business Insider "The Drones Report: Market forecasts, regulatory barriers, top vendors, and leading commercial applications", May 27, 2015; retrieved https://www.businessinsider.com/uav-or-commercial-drone-market-forecast-2015-2; 4 pgs.

Chang, Andrea "With Prime Air, Amazon pl;ans to deliver purcahses via drones", retrieved https://www.latimes.com/business/technology/la-fi-tn-amazon-prime-air-20131202-story.html#ixzz2n; dated Dec. 2, 2013; 2 pgs.

Chicago Tribune "Drone crashes into stadium before Kentucky Wildcats football game", retrieved http://www.chicagotribune.com/sports/college/ct-drone-crashes-kentucky-20150906-story.html; Sep. 6, 2015; 2 pgs.

Chicago Tribune "High-tech paint blocks out cell phone signals", retrieved http://www.chicagotribune.com/news/ct-xpm-2006-03-01-0603010379-story.html; Mar. 1, 2006; 5 pgs.

Chicago Tribune "LAPD detains man they say was flying drone too close to police helicopter", retrieved http://www.chicagotribune.com/la-me-ln-lapd-detains-drone-pilot-20150828-story.html; downloaded Feb. 8, 2016; 2 pgs.

Chow, Denise "Commercial Drones Could Grow Into $10 Billion Industry, Experts Say", LIVESCIENCE.com; https://www.livescience.com/41009-commercial-drones-market-value.html; Nov. 7, 2013; 2 pgs.

Coffey, Wayne et al. "NYC teacher arrested after drone crashes into stands at U.S. Open", retrieved http://www.nydailynews.com/sports/more-sports/drone-crashes-stands-u-s-open-article-1.2348324; Sep. 4, 2015; 6 pgs.

Condliffe, Jamie "Amazon Is Testing Its Delivery Drones in a Secret Location in Canada", retrieved https://gizmodo.com/amazon-is-testing-its-delivery-drones-in-a-secret-locat-1694480406; Mar. 30, 2015; 3 pgs.

Dillow, Clay "What is the drone industry really worth?", Fortune.com; retrieved https://fortune.com/2013/03/12/what-is-the-drone-industry-really-worth/; Mar. 12, 2013; 3 pgs.

Domanico, Anthony "Drone carrying 3 kilos of meth crashes near US-Mexico border", retrieved from https://www.cnet.com/news/drone-carrying-three-kilos-of-meth-crashes-near-us-mexico-border/; Jan. 22, 2015; 3 pgs.

Feld, Harold "Legal Cell Phone Blocking? Cell Phone Blocking Paint and the FCC", Webmachine, Tales of the Sausage Factory; retrieved from https://wetmachine.com/tales-of-the-sausage-factory/legal-cell-phone-blocking/; Mar. 1, 2006; 8 pgs.

Gibbons, Glen "White House Drone Incident Highlights Growing Use of UAVs", retrieved from: http://www.insidegnss.com/node/4414; Feb. 14, 2015; 3 pgs.

Jager, Elliot "Domestic Drone Industry Can Boost Economy", retrieved from: https://www.newsmax.com/Newsfront/drone-economy-domestic-boost/2013/12/03/id/539607/; dated Dec. 3, 2013; 4 pgs.

Kath, Ryan "FAA Investigating Drone Crash in Marblehead" CBS Boston, retrieved from: http://boston.cbslocal.com/2015/05/26/faa-investigating-drone-crash-in-marblehead/; dated May 26, 2015; 3 pgs.

Kharpal, Arjun "Police stop Another drone delivering drugs to prison", CNBC.com; retrieved from http://www.cnbc.com/2015/08/25/police-stop-another-drone-delivering-drugs-porn-to-prison.html; dated Aug. 25, 2015; 3 pgs.

Leavitt, Neal "Up Up and Away: Commercial Drone Market Ready for Take Off", retrieved from: http://blogs.imediaconnection.com/blog/2014/08/30/up-up-and-away-commercial-drone-market-ready-for-take-off/; posted on Aug. 30, 2014; 8 pgs.

Lillian, Betsy "Unauthorized UAV Caught Flying Near Airport in Aspen", retrieved from https://unmanned-aerial.com/unauthorized-uav-caught-flying-near-airport-in-aspen; Jan. 23, 2015; 1 pg.

Molina, Alejandra "Sacramento: Drones increasingly interfering with firefighters", retrieved from https://www.pe.com/2015/08/18/sacramento-drones-increasingly-interfering-with-firefighters/; dated Aug. 18, 2015; 3 pgs.

Morgan, David "FAA to name adviser to handle 'crush' of industry drone queries", retrieved from https://www.reuters.com/article/us-usa-drones-faa/faa-to-name-adviser-to-handle-crush-of-industry-drone-queries-idUSKBN0OJ27520150603; dated Oct. 31, 2013; 2 pgs.

Safe Living Technologies, Inc. "RF Shielding Paint Yshield HSF54", retrieved from https://www.slt.co/products/RFShieldingPaint/ShieldingPaint-YShield-HSF54.aspx; downloaded Feb. 8, 2016; 5 pgs.

Shear, Michael D. et al. "White House Drone Crash Described as U.S. Worker's Drunken Lark", The New York Times, retrieved from https://www.nytimes.com/2015/01/28/us/white-house-drone.html?_r=1; dated Jan. 27, 2015; 4 pgs.

Stone, Maddie "Amazon Can (Finally) Test Its Delivery Drones in the United States", retrieved from https://gizmodo.com/amazon-can-finally-test-its-delivery-drones-in-the-un-1697124779; dated Apr. 11, 2015; 3 pgs.

Teal Group "Teal Group Predicts Worldwide UAV Market Will Total $91 Billion in Its 2014 UAV Market Profile and Forecast", retrieved from: http://www.tealgroup.com/index.php/about-teal-group-corporation/press-releases/118-2014-uav-press-release; published on Jul. 17, 2014; 2 pgs.

Thinkdefence "The Anti-UAV Defence System (AUDS)"; retrieved from: http://www.thinkdefence.co.uk/2015/05/the-anti-uav-defence-system-auds/; dated May 11, 2015; 3 pgs.

Unmanned Aerial Online "Unauthorized UAV Caught Flying Near Airport in Aspen", retrieved from: https://unmanned-aerial.com/unauthorized-uav-caught-flying-near-airport-in-aspen#.VcpHbb78L4Y; dated Jan. 23, 2015; 5 pgs.

WCPO.com Man charged with crashing drone into Great American Tower: retrieved from http://www.wcpo.com/news/local-news/hamilton-county/cincinnati/mich . . . ; posted Aug. 18, 2015; 2 pgs.

Wikipedia "Spray foams (insulation)"; retrieved from http://ct-iptfe01/CPAInpro/Desktop/DesktopDefault.aspx; downloaded Feb. 8, 2016; 3 pgs.

Wilbanks, Charles "Drones: A big industry waiting to be born", retrieved from: https://www.cbsnews.com/news/drones-a-big-industry-waiting-to-be-born/; May 16, 2013; 2 pgs.

Ybarra, Joe "Drone almost hit a Fresno SkyLife helicopter in Fresno", retrieved from: https://abc30.com/news/drone-almost-hits-skylife-helicopter-in-fresno/925394/; Aug. 12, 2015; 5 pgs.

* cited by examiner

VEHICLE DISABLEMENT AND RETRIEVAL

BACKGROUND

The invention relates generally to the control of vehicles and, more specifically, to remotely initiated vehicle disablement and subsequent vehicle retrieval.

Increasingly, various types of vehicles, particularly those that are remotely operated, have been encroaching into restricted-access areas (e.g., airports, sporting events, and government facilities, to name a few). Such vehicles often interfere with the activities conducted in the encroached upon area. In some cases, this intrusion can result in property damage, personal injury, and/or other serious consequences.

SUMMARY

According to an embodiment, a system is provided. The system includes an agent carrier and an agent disposed in an inner cavity of the agent carrier. The agent includes an expandable foaming material and electromechanical signal blocking particles embedded in the expandable foaming material. The system also includes a sensor and agent release mechanism configured to release the agent from the agent carrier based at least in part on a determination, via the sensor, that the agent carrier is within a predetermined distance via the sensor from a vehicle.

According to another embodiment, a method is provided. The method includes positioning an agent deployment device in proximity of a vehicle, loading an agent carrier into an agent carrier holding chamber of the agent deployment device, disposing a first end of a tethering line into the agent carrier, and affixing a second end of the tethering line to the agent deployment device. The method also includes launching the agent carrier from the agent deployment device. The agent carrier releases an agent to encapsulate the vehicle. The agent includes an expandable foaming material that cures and solidifies to form a plastic around the vehicle, and the first end of the tethering line is secured to the vehicle via the solidified expandable foaming material. The method also includes retrieving the vehicle via the tethering line.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes storing, in a memory that is communicatively coupled to the computer processor, a data value indicating a maximum distance in which an agent carrier is capable of being deployed from an agent deployment device. The agent deployment device is communicatively coupled to a laser rangefinder via the computer processor. The program instructions also include activating the laser rangefinder device. The laser rangefinder device calculates a distance between the agent deployment device and the vehicle. The program instructions further include receiving a data value indicating the distance, and permitting deployment of the agent carrier from the agent deployment device when the data value indicating the distance is less or equal to the data value stored in the memory. The agent includes an expandable foaming material and electromechanical signal blocking particles. The expandable foaming material is configured to cure and solidify to form a plastic around the vehicle, and the electromechanical signal blocking particles are configured to block communications between the vehicle and a remote operator of the vehicle.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide vehicle disablement and retrieval processes, as well as associated systems. The disclosed vehicle disablement and retrieval processes and systems provide the ability to disable the operations of a vehicle (also referred to herein as "vehicle") including its communications without compromising the integrity of the vehicle, such that its components and functionality are preserved for analysis and other activities. The disclosed system includes an agent deployment device and an agent carrier. The agent deployment device launches the agent carrier in the direction of the vehicle, and the agent carrier releases a signal blocking expandable foaming material to at least partially encapsulate the vehicle. The signal blocking expandable foaming material substantially interferes with communications to and from the vehicle, and the components of the signal blocking expandable foaming material provide a buffer around the vehicle to facilitate a soft landing, thereby preserving the vehicle as well as potentially protecting objects or people below during its landing. The system also includes a tethering apparatus that enables easy retrieval of the vehicle once it has been disabled.

By substantially interfering with the vehicle's communications, the disclosed vehicle disablement and retrieval processes and system can prevent a remote operator of the vehicle from conducting a self-destruct operation with respect to the vehicle, which could eliminate the recovery of critical data stored therein. The vehicle, once disabled, can be retrieved for forensic analysis, e.g., to determine ownership or an identity of the remote operator, and further to ensure accountability of those entering into restricted areas.

Figure 1:
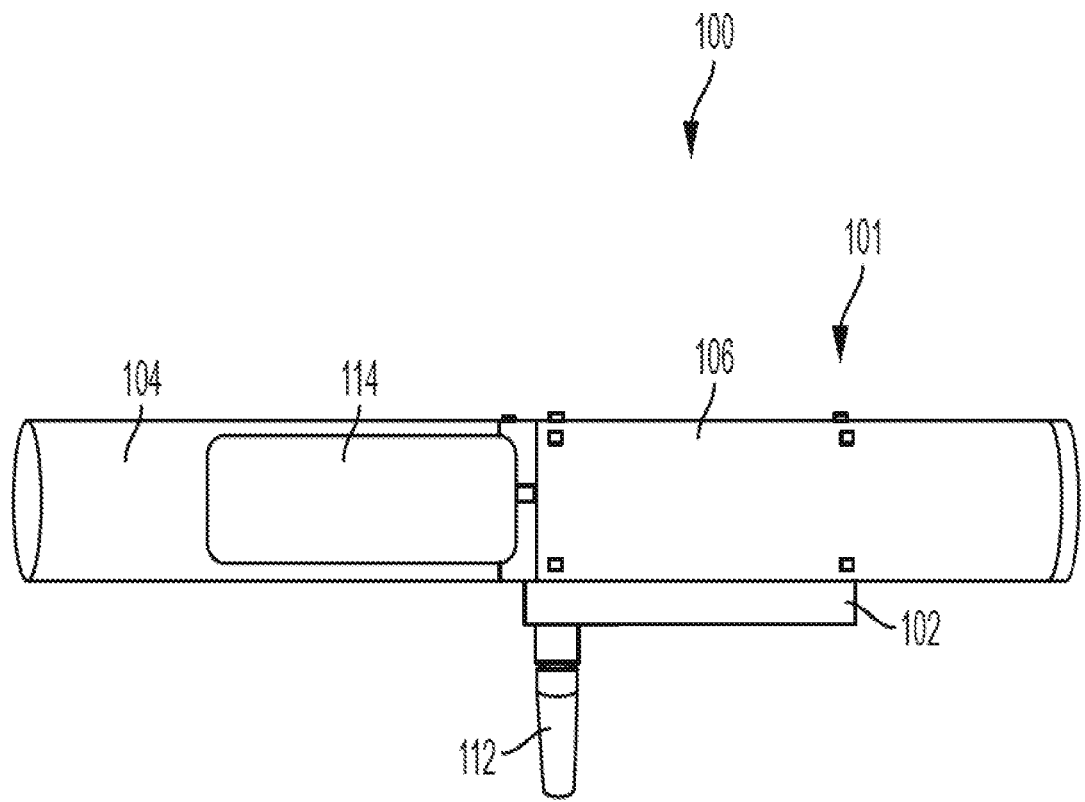
FIG. 1 depicts a system for disabling a vehicle according to an embodiment of the invention.

Turning now to FIG. 1, a system 100 upon which the disclosed vehicle disablement and retrieval processes may be implemented will now be described in an embodiment. The system 100 includes an agent deployment device 101 and an agent carrier 114. The agent deployment device 101 may be configured for handheld mobile use or as a fixed location (e.g., ground mounted) device, a marine deployed device (e.g., water vessel), or an aerial deployed device.

The agent deployment device 101, in turn, includes a base 102, and an agent carrier holding chamber 104 coupled to an auxiliary chamber 106. The auxiliary chamber 106 is affixed to the base 102. The agent deployment device 101 may also include a handle (not shown), a launch activation control (not shown), and a propellant device 112. The launch activation control may be implemented as a physical latch or lever that is depressed or otherwise activated to initiate deployment of the agent carrier 114 from the agent deployment device 101. The launch activation control is configured to be engaged by an operator of the agent deployment device 101 through leverage of the handle. The propellant device 112 may be implemented, e.g., using a compression-based $CO_2$ canister or an electric-based piston channel slide. In an embodiment, if the propellant device 112 is implemented using compression, then upon selection of the launch activation control, the propellant device 112 is configured to release the pressured $CO_2$ into the auxiliary chamber 106 and agent carrier holding chamber 104. The pressurized $CO_2$ causes the agent carrier 114 to be deployed from the agent carrier holding chamber 104.

The agent carrier 114 is sized to fit within the agent carrier holding chamber 104 of the agent deployment device 101. The agent carrier holding chamber 104 may be shaped in any aerodynamic configuration known by those skilled in the art to maximize its distance upon its launch from the agent deployment device 101.

Figure 2:
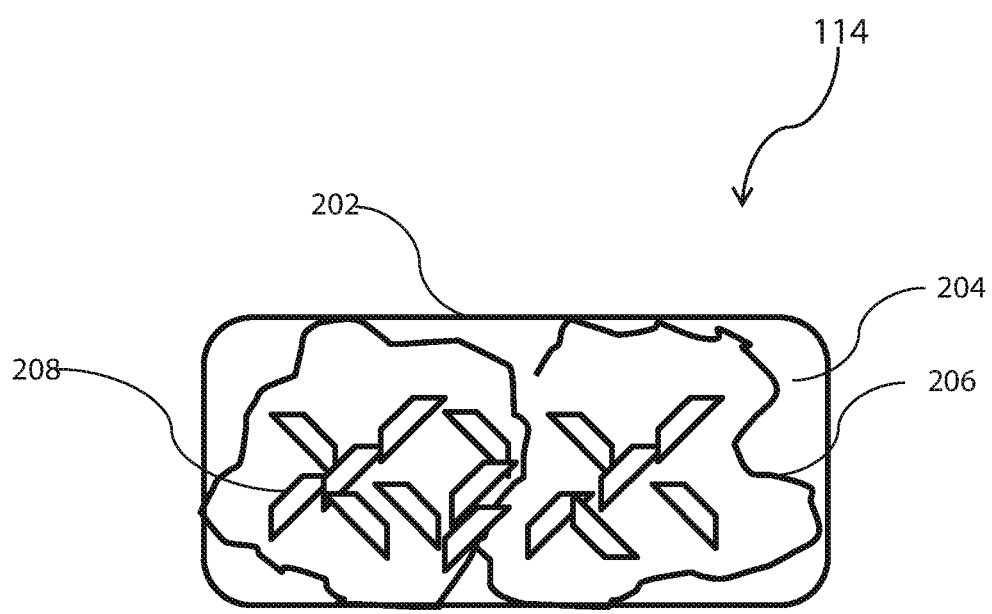
FIG. 2 depicts an agent carrier according to an embodiment.

Turning now to FIG. 2, the agent carrier 114 is described in an embodiment. The agent carrier 114 is configured with an outer layer 202 and an inner cavity 204. The outer layer 202 may be of any material capable of breaking apart or dissolving through some internal or external catalyst, such that its contents can be released as described herein. In an embodiment, an agent is injected into the agent carrier 114. The agent includes an expandable foaming material 206 (also referred to herein as "material") and electromechanical signal blocking particles 208 (also referred to herein as "particles"). Collectively, the expandable foaming material 206 and the electromechanical signal blocking particles 208 are referred to the "agent" and "signal blocking expandable foaming material."

In an embodiment, the expandable foaming material 206 is comprised of a compound material that expands upon release from a container in which it is stored (e.g., the agent carrier 114). For example, the expandable foaming material 206 may be comprised, at least in part, of polyurethane. The material 206 is configured to provide floatable properties for use in a marine-based environment. In addition, the material 206 is configured to be dissolvable either over time or through the use of a solvent, to enable access to, and analysis of, a disabled vehicle that has been at least partially encapsulated via the material 206. As a polyurethane-based material, the expandable foaming material 206 is configured to cure and harden into a solid plastic. In one non-limiting embodiment, the expandable foaming material 206 may be implemented using a polyurethane spray foam insulation material base with an expansion ratio targeted for the environment that the system will used in depending on the needed density of the foam for the application. In an embodiment, the expandable foaming material 206 is configured to expand to approximately 5 times its original mass.

The electromechanical signal blocking particles 208 may be comprised of any metallic material capable of blocking the transmission and receipt of signals (e.g., radio frequencies, microwaves, etc.). In an embodiment, the particles 208 may be comprised of copper, aluminum, and/or carbon nano-tubes, to name a few. The ratio of electromechanical signal blocking particles 208 to the foaming material 206 in the agent may vary based on the intended application, as well as the dimensions of the vehicle. In an embodiment, different ratios of radio blocking materials may be added into the foaming material 206 depending upon the application, cost (e.g., basic radio frequency blocking materials versus premium radio frequency blocking materials), and/or the desired effectiveness in performing radio frequency blocking functions.

Figure 3:
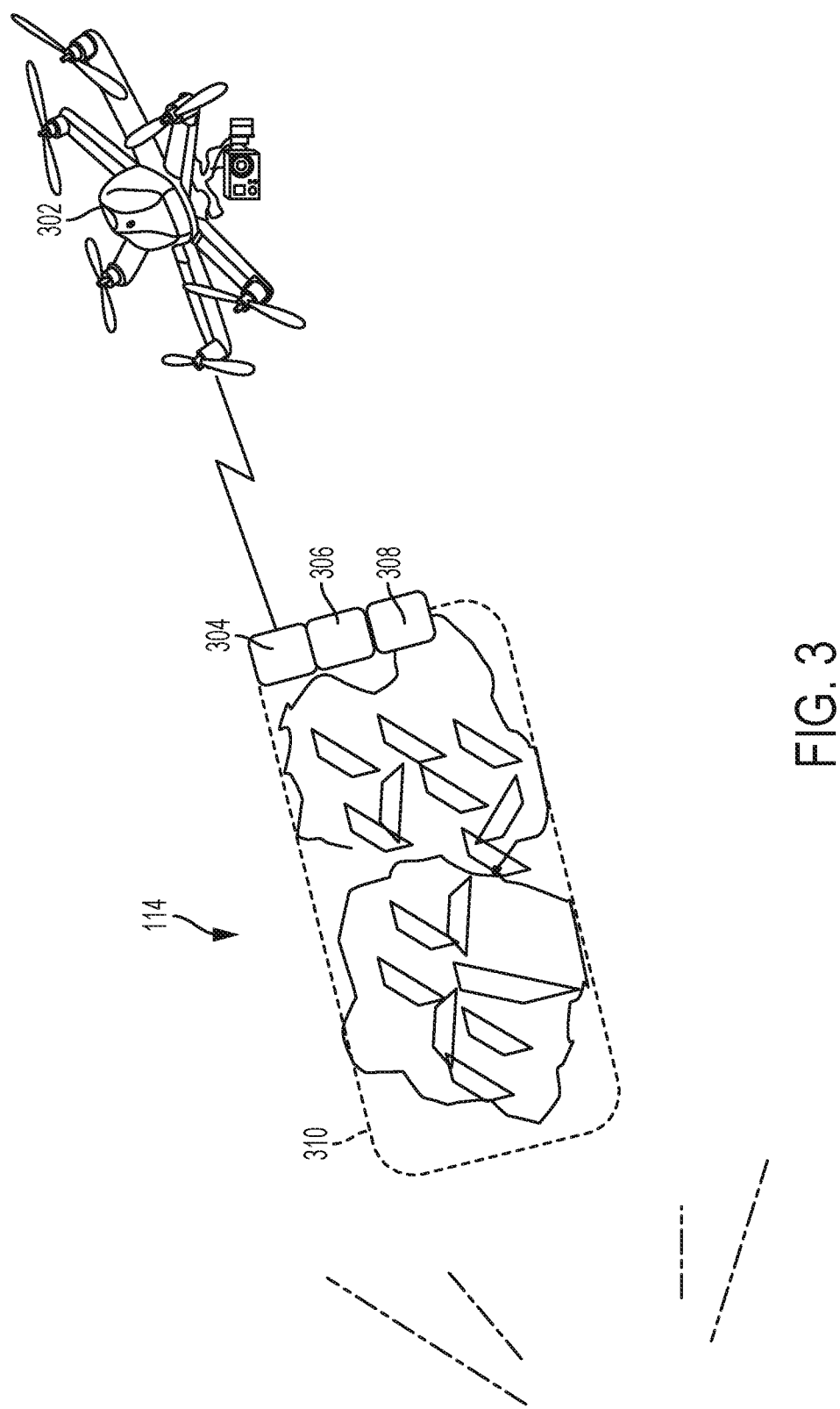
FIG. 3 depicts an agent carrier in an active stage of deployment with respect to a vehicle according to an embodiment of the invention.

Turning now to FIG. 3, the agent carrier 114 is illustrated in another embodiment. The agent carrier 114 of FIG. 3 is shown in an active state of deployment toward a vehicle 302. As shown in FIG. 3, the vehicle 302 is a remote controlled aerial vehicle. The agent carrier 114 includes a sensor device 304, a computer processor 306, and an agent release mechanism 308. The sensor device 304 senses the presence of the vehicle in proximity of the agent carrier 114. The sensor device 304, e.g., may be a temperature sensor, a motion sensor, or other type of detection device. The computer processor 306 is configured to receive the sensor data from the sensor device 304, and when the sensor device 304 provides data affirming the presence of the vehicle 302, the computer processor 306 is configured to activate the agent release mechanism 308 to initiate the rupture and/or dissolution of the outer layer of the agent carrier 114. In an embodiment, the rupture function may be implemented through electricity emitted from the agent releasing mechanism that causes the outer layer material to break apart. The dissolution function may be implemented through the release of a chemical from the release mechanism 308 that disintegrates the outer layer. It is understood that other means of deterioration of the outer layer to release the agent may be used. The aforementioned means are provided for illustration and are not to be construed as limiting in scope. As shown in FIG. 3, once activated, a partially disintegrated outer layer 310 is shown.

Figure 4:
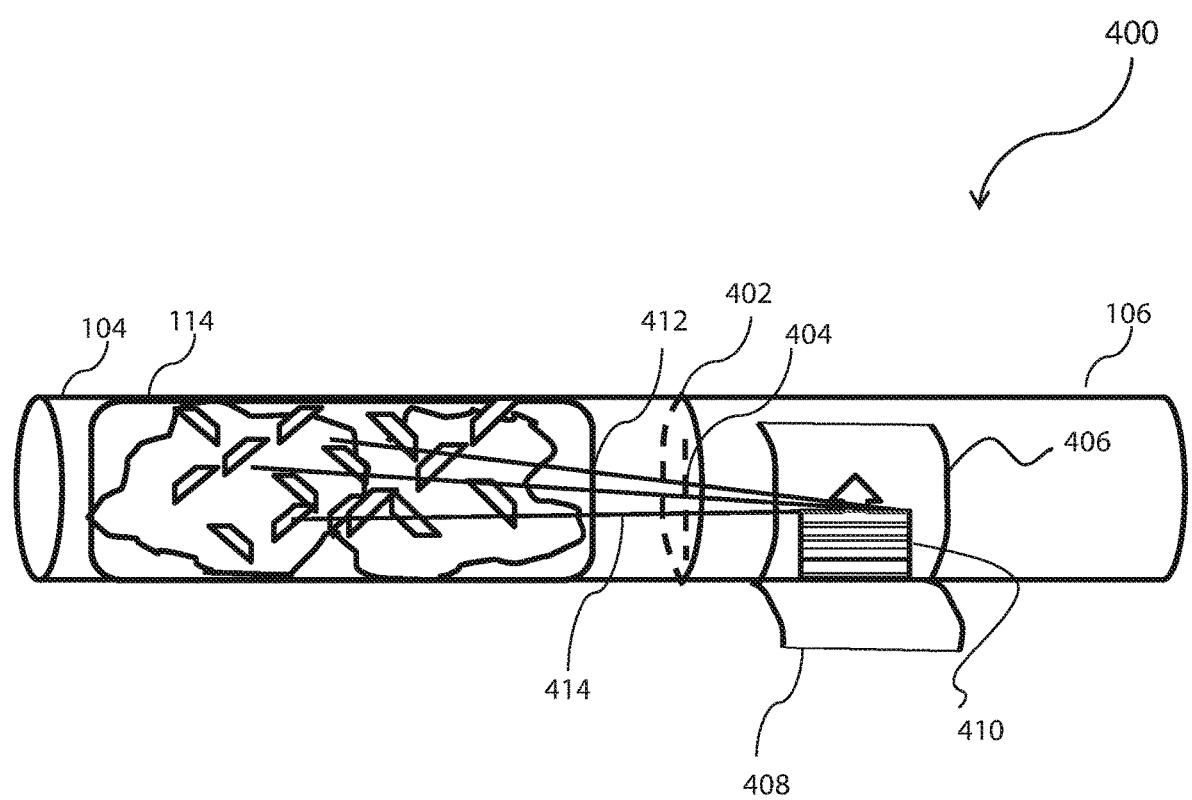
FIG. 4 depicts a partial view of a system according to another embodiment.

As indicated above, the agent deployment device 101 is configured to retrieve the vehicle once it is disabled. Turning now to FIG. 4, a partial view of a system 400 including an agent deployment device in an alternative embodiment is shown. The agent deployment device of the system 400 includes a membrane 402 separating the agent carrier holding chamber 104 from the auxiliary chamber 106. The membrane 402 includes an opening 404 for receiving one or more tethering lines 414. In one embodiment, the tethering lines 414 are made of a plastic material. A first end of each of the tethering lines 414 is disposed in the agent carrier 104 through an opening 412 in an end of the agent carrier 104 that faces the auxiliary chamber 106, and a second end of each of tethering lines 414 is affixed to a spool 410.

In one embodiment, the auxiliary chamber 106 includes an opening 406 that forms a compartment within the chamber 106. A door 408 is operable to open and close to allow access to the spool 410, which is fixably disposed in the compartment through the opening 406. Alternatively, the spool 410 may be affixed to an outer edge of the agent deployment device. In one embodiment, a reeling device (shown generally in FIG. 6) may be used to collect a captured vehicle via the tethering lines 414. In an embodiment, the tethering lines 414 can be configured with lighted optical fibers for ease in vehicle retrieval functions that occur at night.

Figure 5:
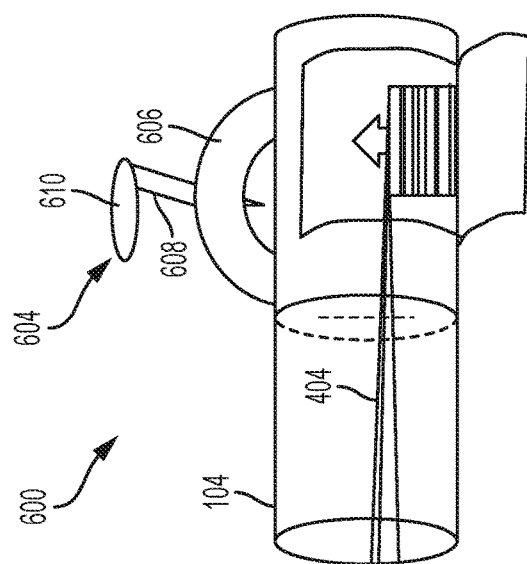
FIG. 5 depicts an agent-encapsulated vehicle according to an embodiment.
Figure 6:
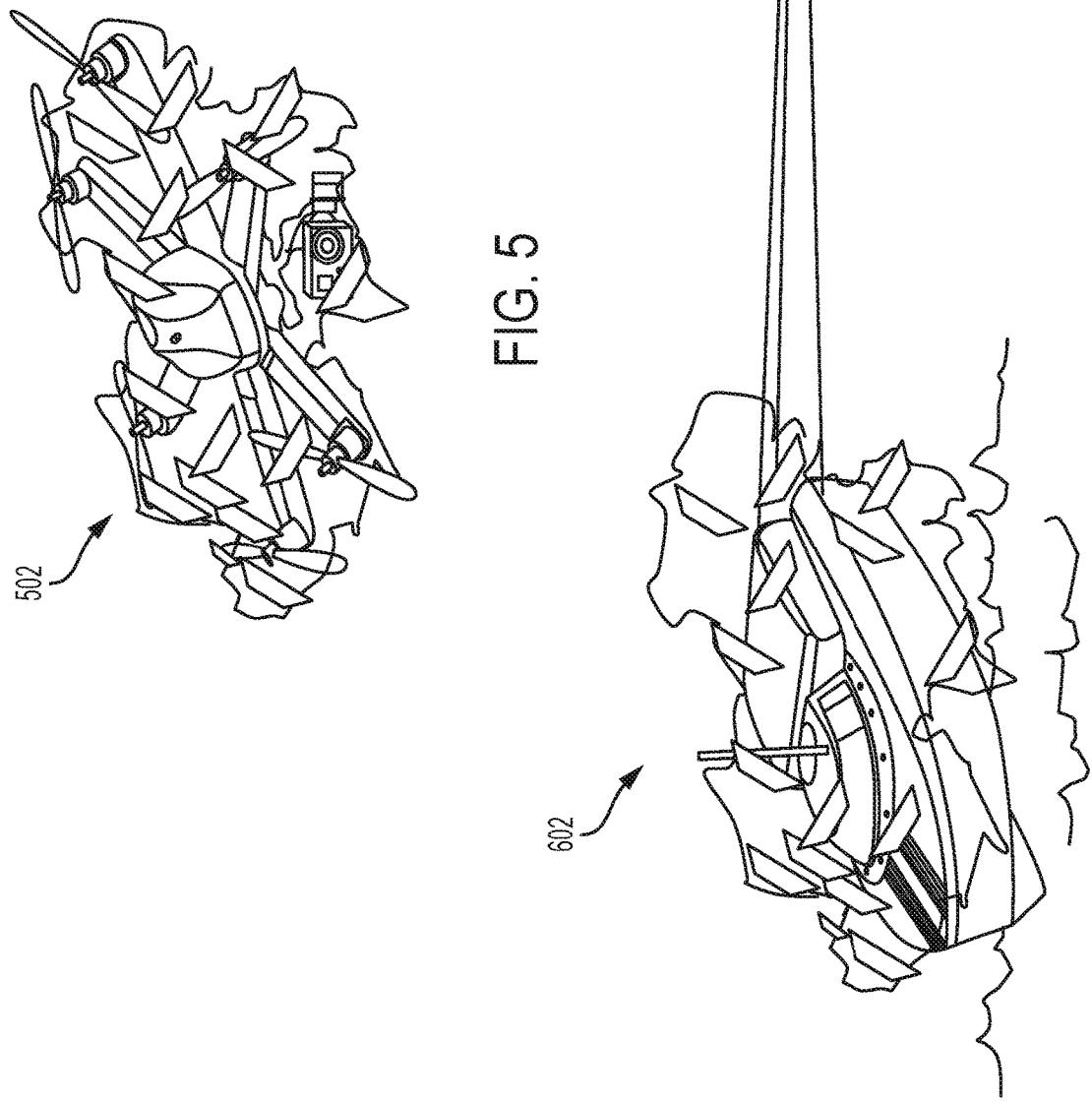
FIG. 6 depicts another agent-encapsulated vehicle that is tethered by an agent deployment device and carrier according to an embodiment.

FIG. 5 depicts an agent encapsulated vehicle 502, which is shown as a remote controlled aerial vehicle. FIG. 6 depicts a system 600 including an agent encapsulated vehicle 602 that is tethered to an agent deployment device similar to the agent deployment device shown in FIG. 4. The agent deployment device shown in FIG. 6 includes a reeling device 604 affixed to an outer surface thereof. The reeling device 604 is coupled to the spool disposed in the compartment of the chamber 106. As shown in FIG. 6 by way of non-limiting example, the reeling device 604 includes a rotatable wheel 606 coupled to the spool and a handle shaft 608 that couples the wheel 606 to a handle 610. As indicated above in FIG. 4, a first end of the tethering line is embedded in the agent in the agent carrier through an opening in the outer layer of the agent carrier and a second end of the tethering line is fixed to the spool. A slack portion of the tethering line between the agent carrier and the spool is wound around the spool. In operation, a user rotates the wheel 606 via a circular movement of the handle shaft 608 to reel in the tethering lines 414.

Figure 7:
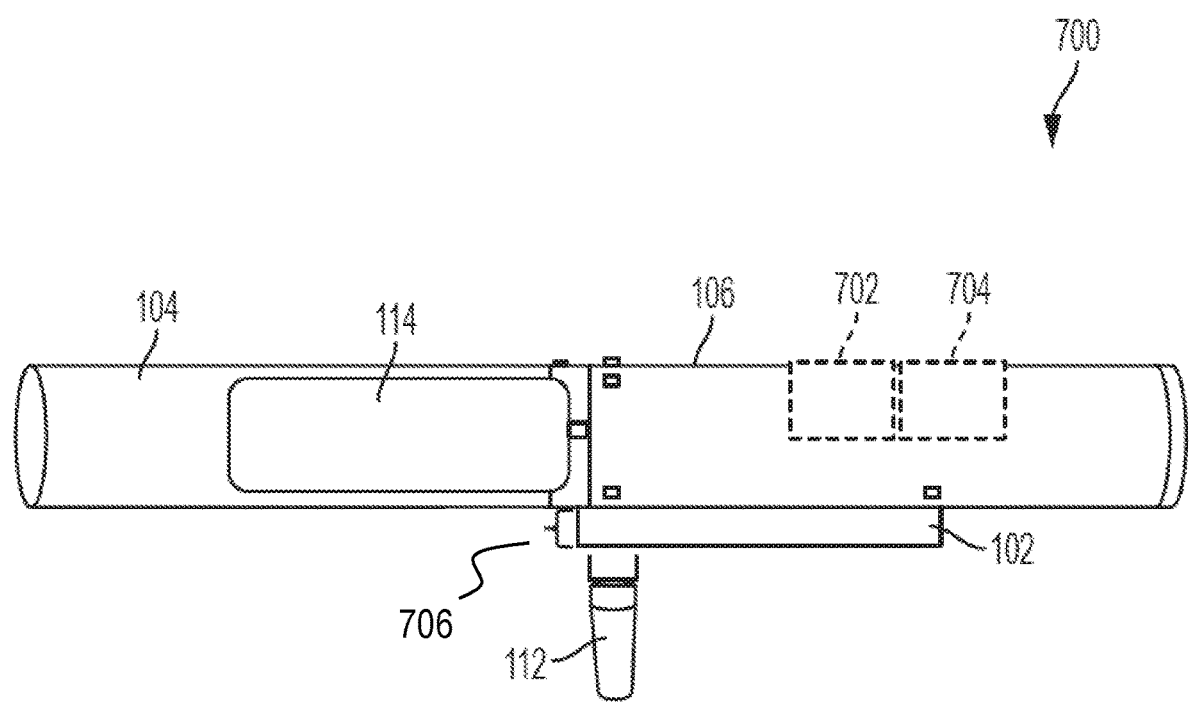
FIG. 7 depicts a system according to a further embodiment.

Turning now to FIG. 7, a system 700 including an agent deployment device according to another embodiment is shown. The agent deployment device of FIG. 7 includes components similar to those in FIGS. 1, 4, and 6, and these components will not be further described. However, unlike the agent deployment devices of FIGS. 1, 4 and 6, the agent deployment device of FIG. 7 includes a computer processor 702, a memory 704, and a laser rangefinder 706. The memory 704 stores a data value representing a maximum distance in which the agent carrier 114 is capable of traversing upon launch. The laser rangefinder 706 emits a laser beam and determines distance by the time it takes for the laser pulse to be reflected from the vehicle and returned to the agent deployment device. The measured distance is compared, via the computer processor, to the data value stored in memory 704 to determine whether the vehicle is close enough to reach by the agent carrier. If so, the computer processor 702 is configured to enable the deployment of the agent carrier 114 in response to selection of the launch activation control. Otherwise, if the vehicle is not close enough to reach by the agent carrier, as determined by the compared distance values, the computer processor 702 is configured to disable the deployment of the agent carrier 114 in response to selection of the launch activation control, thereby preventing a wasted effort to disable the vehicle. In one embodiment, the computer processor 702 may be configured to disable the functionality of the launch activation control when it is determined that the vehicle is not close enough to the agent deployment device.

Figure 8:
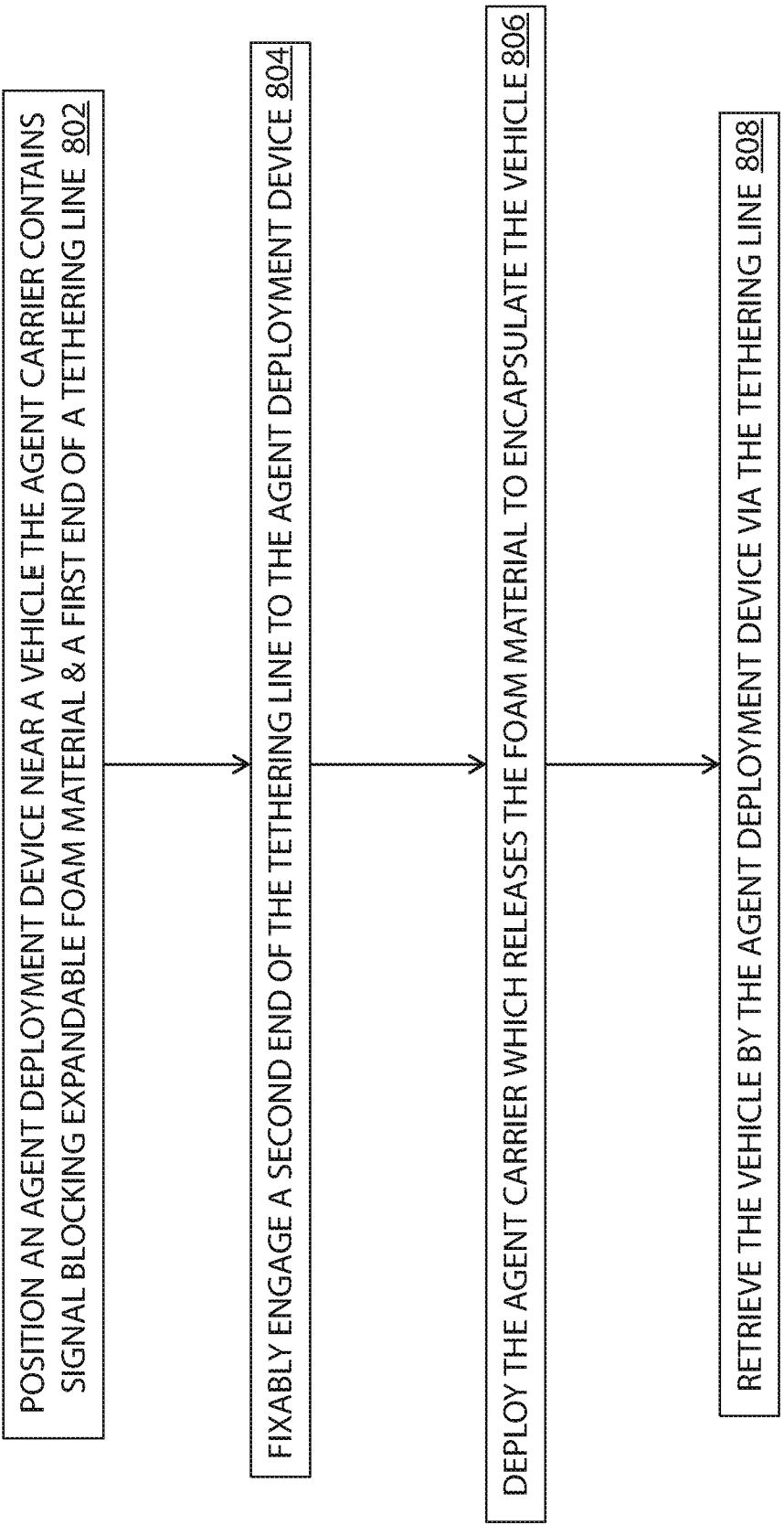
FIG. 8 depicts a flow diagram of a process for disabling and retrieving a vehicle according to an embodiment.

FIG. 8 is a flow diagram of a process for implementing the vehicle disablement and retrieval system in an embodiment. In block 802, the agent deployment device 101 is positioned in proximity of a vehicle. As indicated above, the agent deployment device may be a fixed, ground-based device, an aerial deployed device, and/or a marine deployed device. The agent carrier 114 is loaded into the agent carrier holding chamber 104, and a first end of a tethering line is disposed in the carrier 114.

In block 804, a second end of the tethering line is affixed to the agent deployment device (e.g., via the spool). It is understood that the tethering line may be affixed to the carrier 114 and the agent deployment device 101 prior to the step in block 802.

In block 806, the agent carrier is deployed from the agent deployment device and the agent is released to encapsulate the vehicle. The expandable foaming material cures and solidifies to form a plastic around the vehicle to form a bond with the vehicle, and the first end of the tethering line is secured to the vehicle via the solidified expandable foaming material of the agent. In block 808, the vehicle is retrieved by reeling in the tethering line via the reeling device.

Technical effects and benefits include disablement and retrieval of a vehicle by an agent deployment device, agent carrier, and an agent that is injected into the agent carrier. The agent includes a signal blocking expandable foaming material that encapsulates the vehicle upon deployment of the agent carrier at or in proximity of the vehicle. The signal blocking expandable foaming material blocks communications to and from the vehicle. By blocking the vehicle's communications, the processes and system prevent the ability for a remote operator of the vehicle to conduct a self-destruct operation with respect to the vehicle, which could eliminate the recovery of critical data stored therein. The vehicle, once disabled, can be retrieved through a tethering apparatus for forensic analysis, e.g., to determine ownership or an identity of the remote operator, and further to ensure accountability of those entering into restricted areas.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    an agent carrier;
    an agent disposed in an inner cavity of the agent carrier, the agent comprising an expandable foaming material and electromechanical signal blocking particles embedded in the expandable foaming material;
    a sensor and agent release mechanism configured to release the agent from the agent carrier based at least in part on a determination, via the sensor, that the agent carrier is within a predetermined distance from a vehicle, wherein the expandable foaming material, subsequent to deployment, is configured to solidify to form a plastic,
    a plurality of tethering lines comprising lighted optical fibers;
    a spool flexibly attached to the agent deployment device, wherein a first end of each of the plurality of the tethering lines is embedded in the agent carrier through an opening in an outer layer of the agent carrier, a second end of each of the plurality the tethering lines is fixed to the spool, and a slack portion of each of the plurality the tethering lines between the agent carrier and the spool is wound around the spool; and
    a reeling device coupled to the spool, the reeling device configured to recover portions of each of the plurality the tethering lines released during deployment of the agent carrier;
    wherein when the expandable foaming material solidifies and bonds to the vehicle, the first end of each of the plurality the tethering lines is secured in the plastic expandable foaming material through solidification of the expandable foaming material, and the vehicle is retrievable by the agent deployment device via each of the plurality tethering lines and the reeling device.

2. The system of claim 1, further comprising an agent deployment device, the agent deployment device including:
an agent carrier holding chamber; and
a propellant device configured to launch the agent carrier from the agent deployment device;
wherein the expandable foaming material of the agent is configured to expand to at least partially envelope the vehicle, and the electromechanical signal blocking particles are configured to block communications between the vehicle and a remote operator of the vehicle.

3. The system of claim 2, wherein the propellant device includes a propellant cylinder configured to store and deliver compressed air to a chamber of the agent deployment device.

4. The system of claim 2, wherein the agent deployment device further includes:
a computer processor;
a memory communicatively coupled to the computer processor, the memory storing a data value indicating a maximum distance in which the agent carrier is capable of being deployed; and
a laser rangefinder communicatively coupled to the computer processor;
wherein upon activating the laser rangefinder, the laser rangefinder calculates a distance between the agent deployment device and the vehicle, and the computer processor receives a data value indicating the distance;
wherein the computer processor permits deployment of the agent carrier when the data value indicating the distance is less than or equal to the data value stored in the memory; and
wherein the computer processor prevents deployment of the agent carrier when the data value indicating the distance is greater than the data value stored in the memory.

5. The system of claim 1, wherein the vehicle is a remote controlled water vessel.

6. The system of claim 1, wherein the vehicle is a remote controlled aerial vehicle.

7. The system of claim 1, wherein the expandable foaming material comprises a polyurethane plastic composition and the electromechanical signal blocking particles are comprised of at least one of copper, aluminum, and carbon nano-tubes.

\* \* \* \* \*